Figure 1:
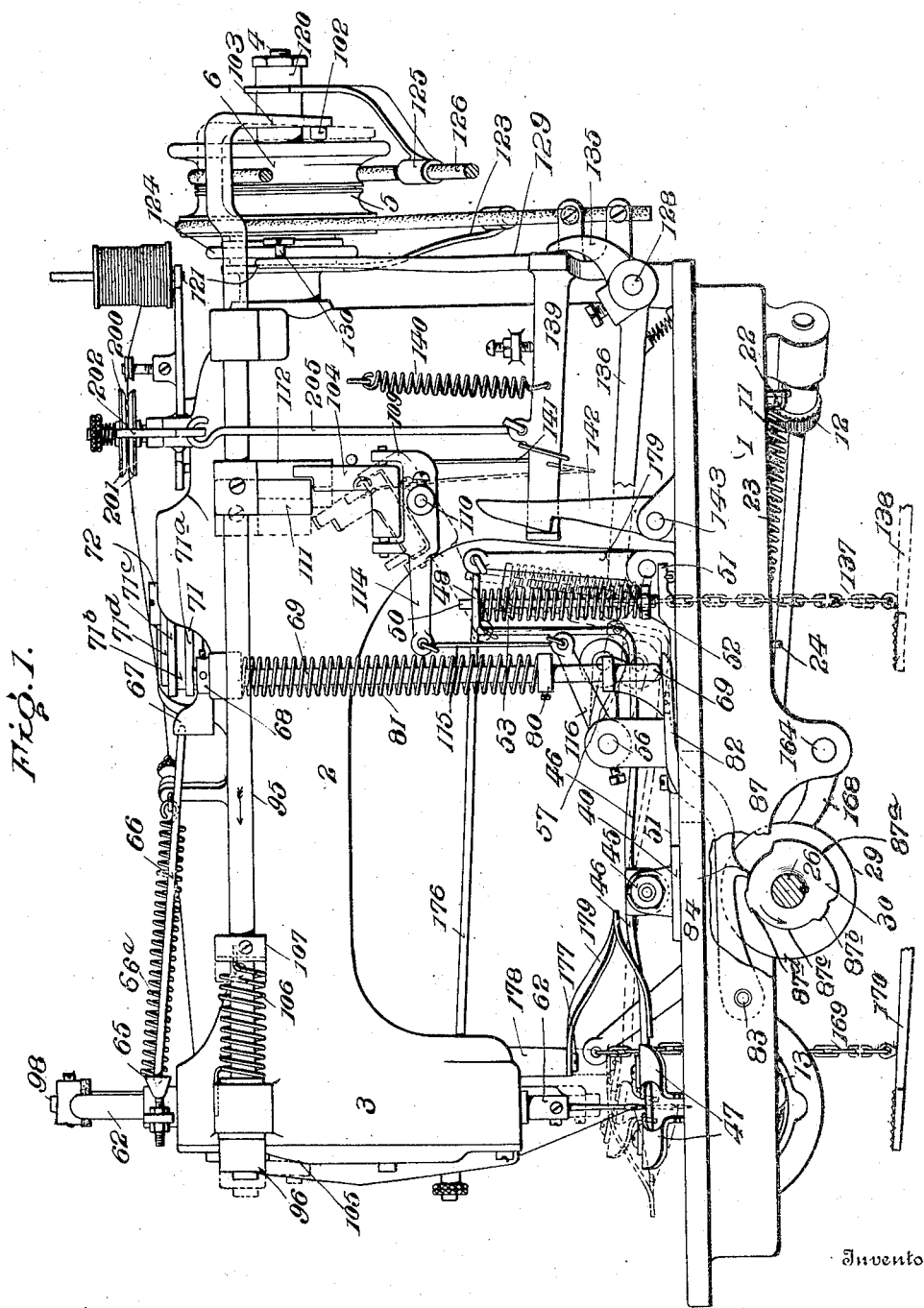

H. C. MILLER.
BUTTONHOLE SEWING MACHINE.
APPLICATION FILED MAR. 12, 1906.

1,006,583.

Patented Oct. 24, 1911.
15 SHEETS—SHEET 1.

Witnesses
W. A. Williams.
Alice H. Bennett.

Inventor
H. C. Miller.
By
Attorney

H. C. MILLER.
BUTTONHOLE SEWING MACHINE.
APPLICATION FILED MAR. 12, 1906.

1,006,583.

Patented Oct. 24, 1911.
15 SHEETS—SHEET 4.

Witnesses
W. A. Williams
Alice H. Bennett

Inventor
H. C. Miller.

Attorney

H. C. MILLER.
BUTTONHOLE SEWING MACHINE.
APPLICATION FILED MAR. 12, 1906.

1,006,583.

Patented Oct. 24, 1911.
15 SHEETS—SHEET 5.

Witnesses
W. A. Williams
Alice H. Bennett

Inventor
H. C. Miller
By
Attorney

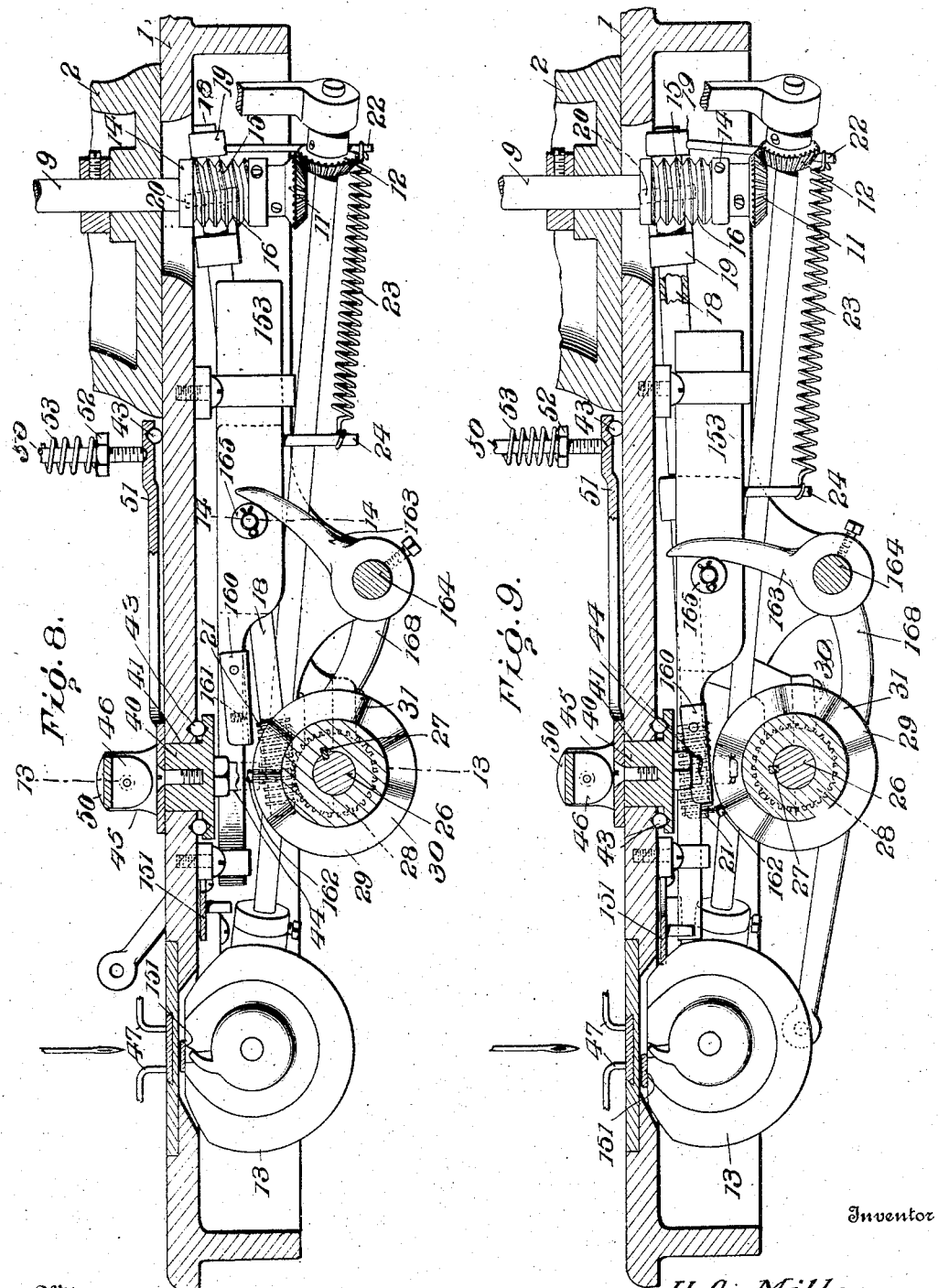

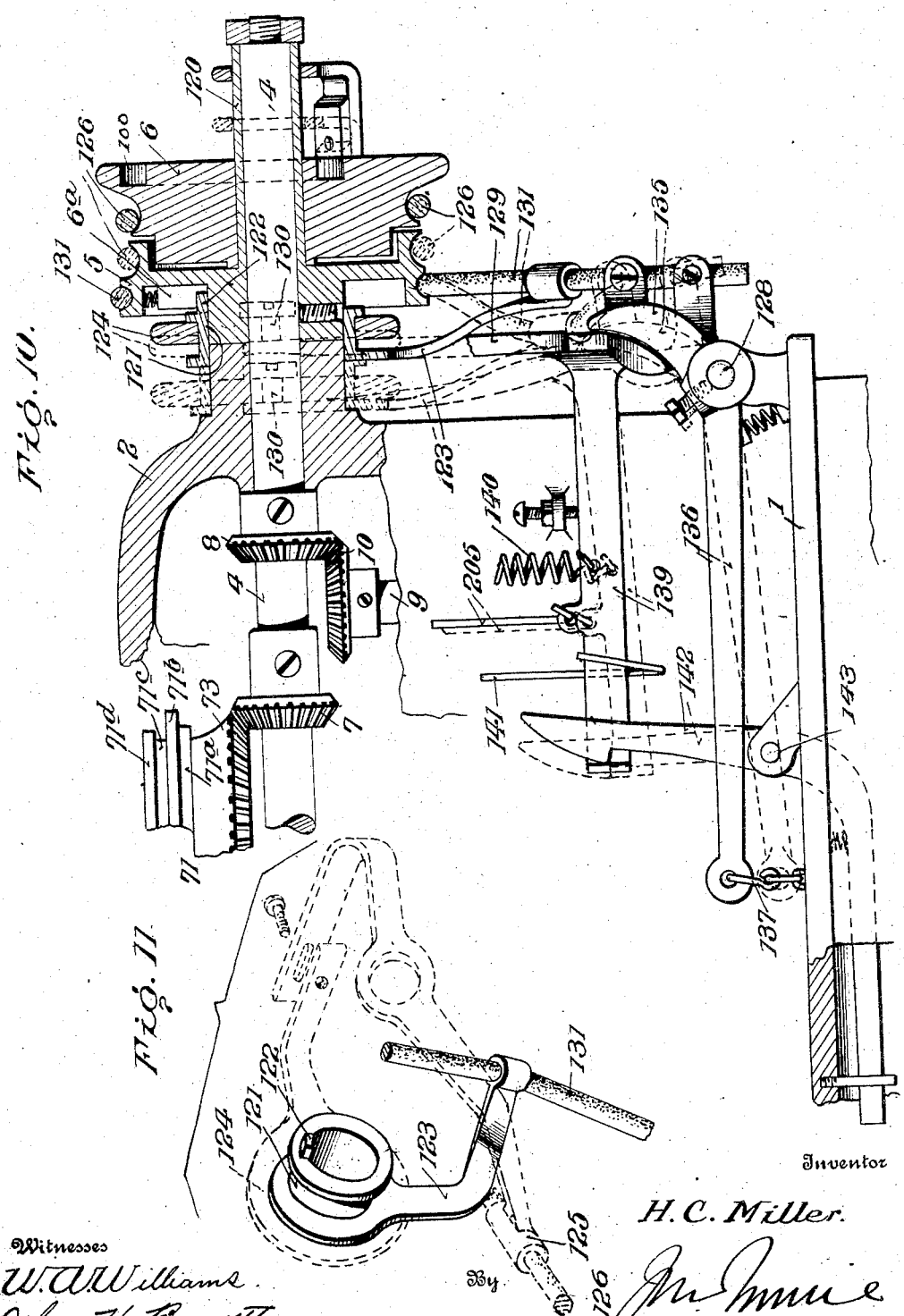

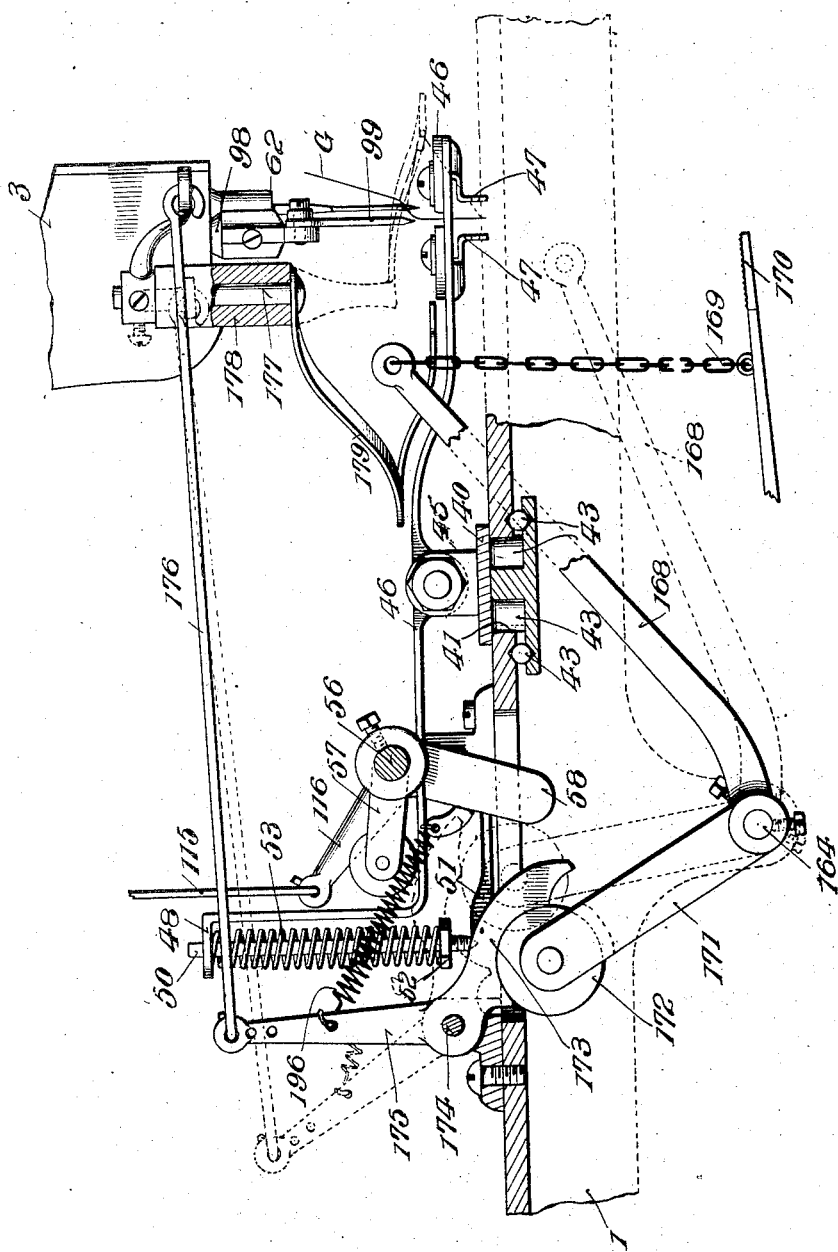

H. C. MILLER.
BUTTONHOLE SEWING MACHINE.
APPLICATION FILED MAR. 12, 1906.

1,006,583.

Patented Oct. 24, 1911.
15 SHEETS—SHEET 9.

Witnesses
W. A. Williams
Alice H. Bennett

Inventor
H. C. Miller
By, Jno. Imrie
Attorney

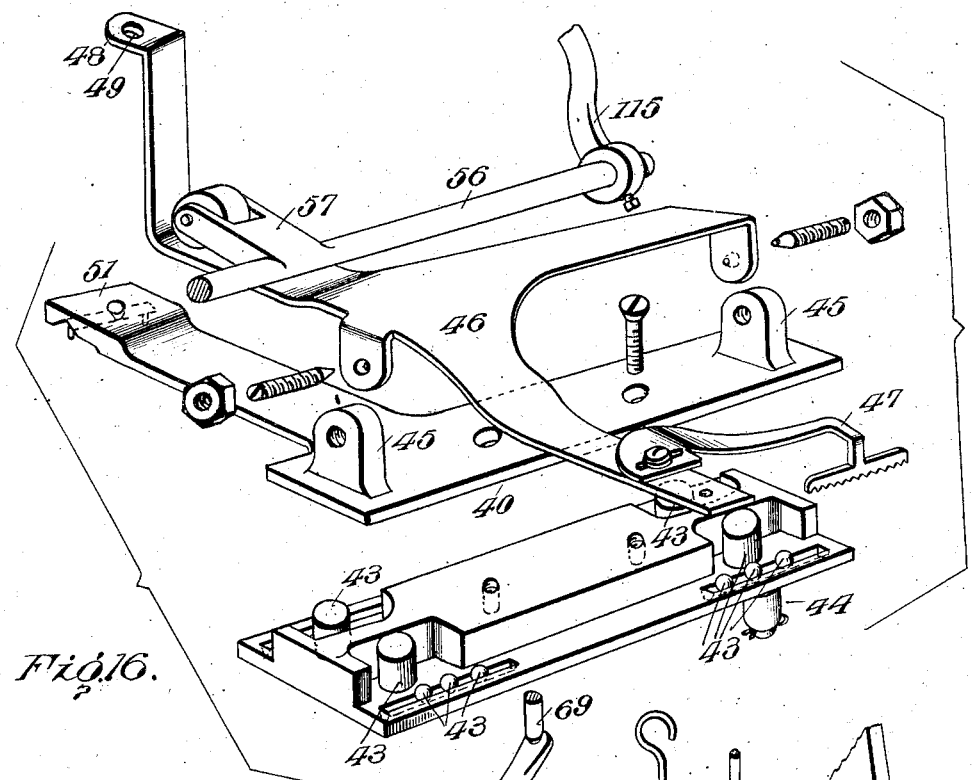
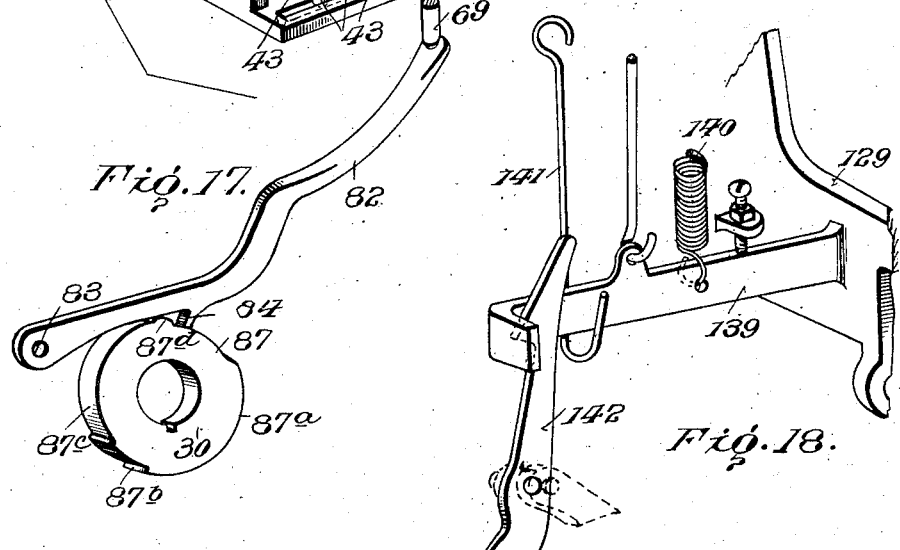
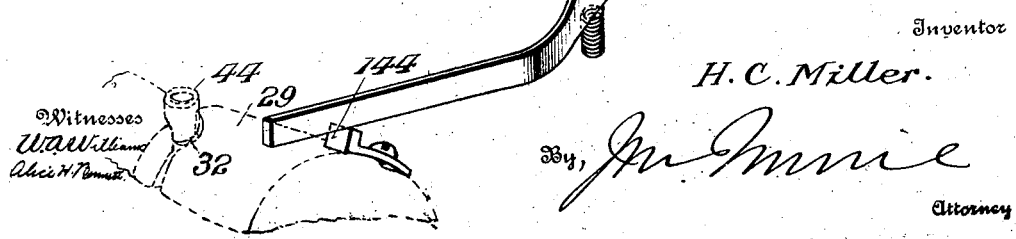

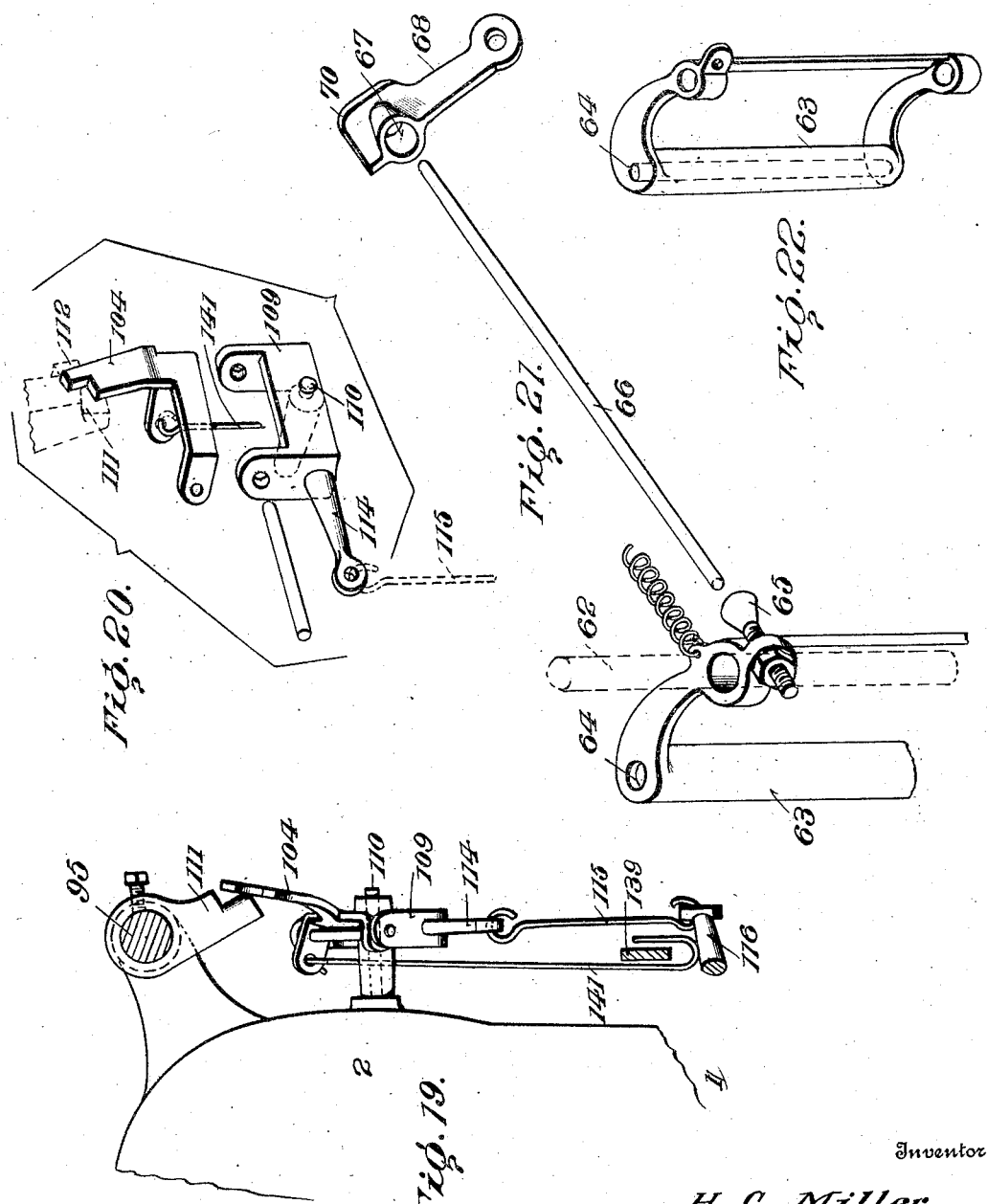

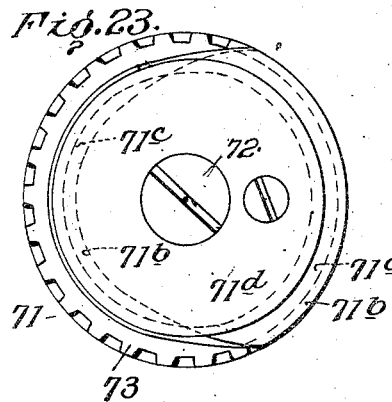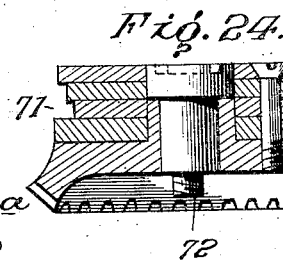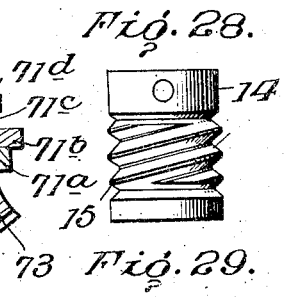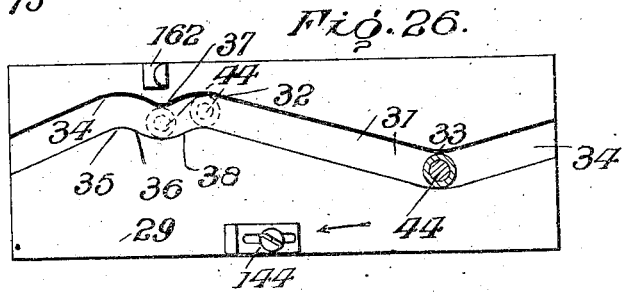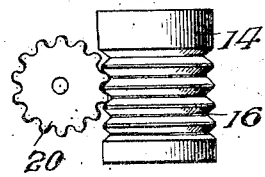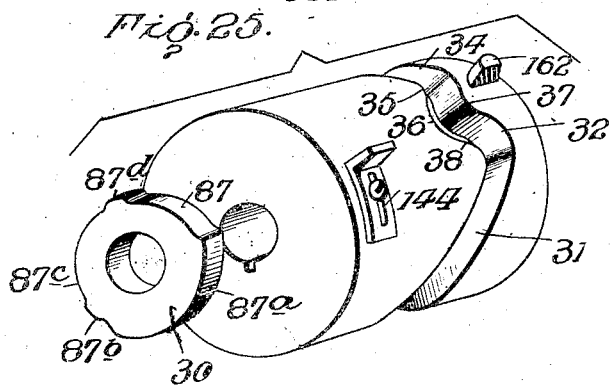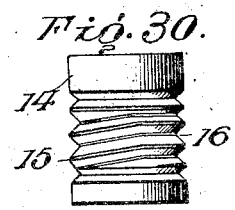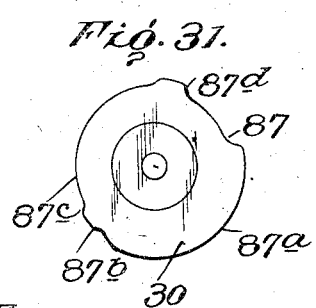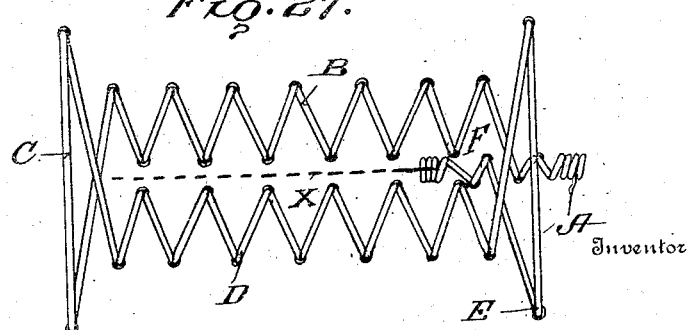

H. C. MILLER.
BUTTONHOLE SEWING MACHINE.
APPLICATION FILED MAR. 12, 1906.
1,006,583.
Patented Oct. 24, 1911.
15 SHEETS—SHEET 13.
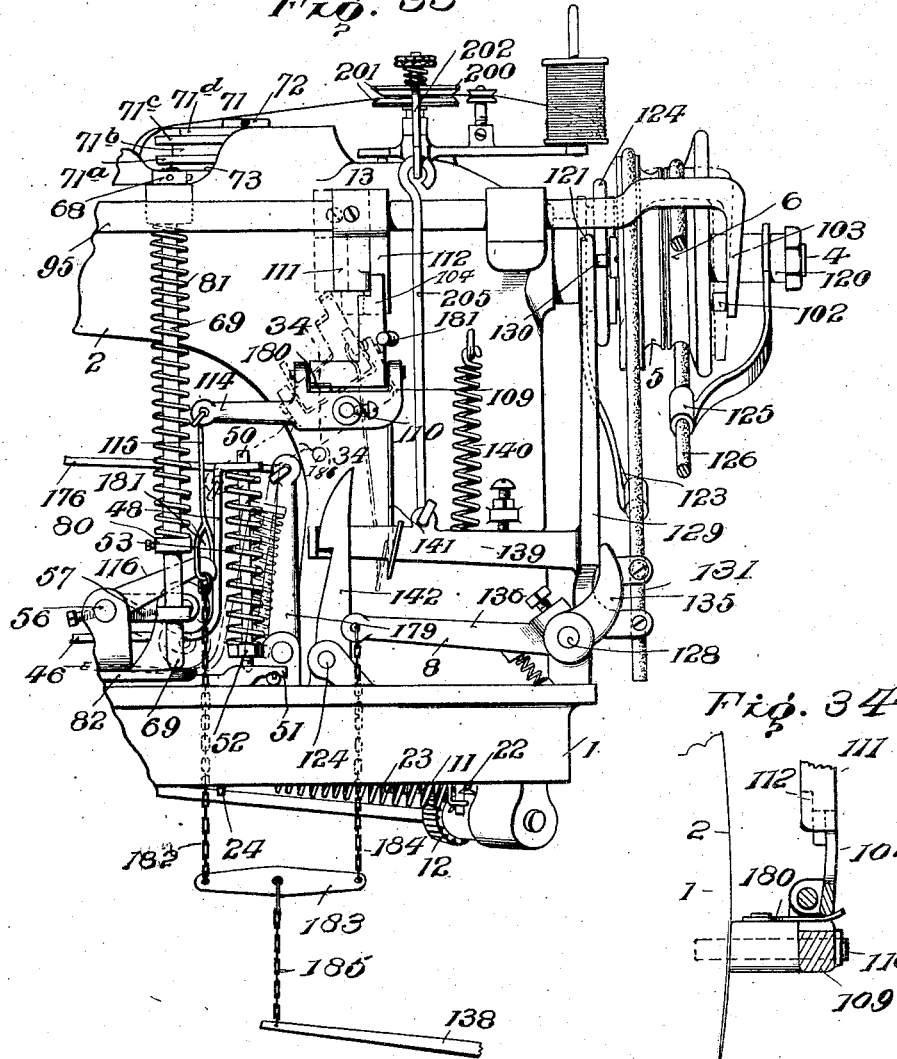
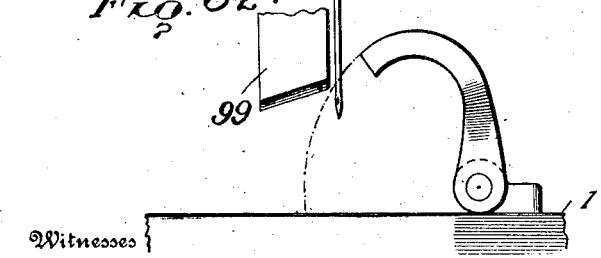
Inventor
H. C. Miller

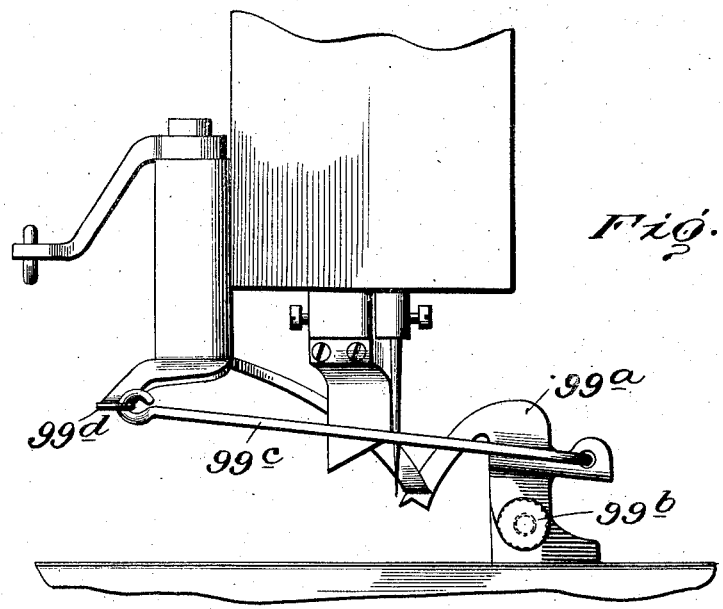
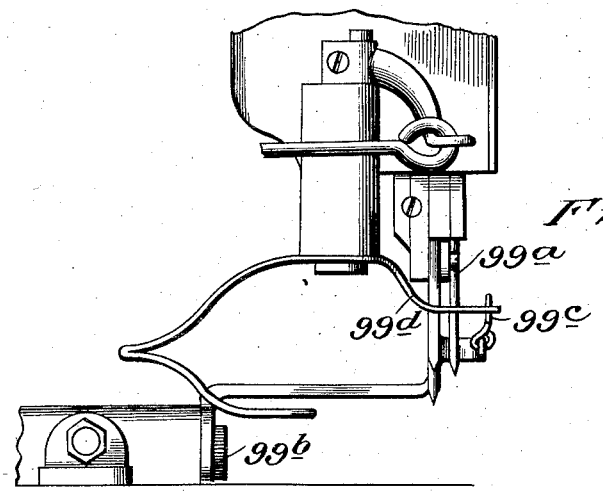
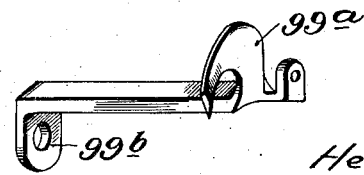

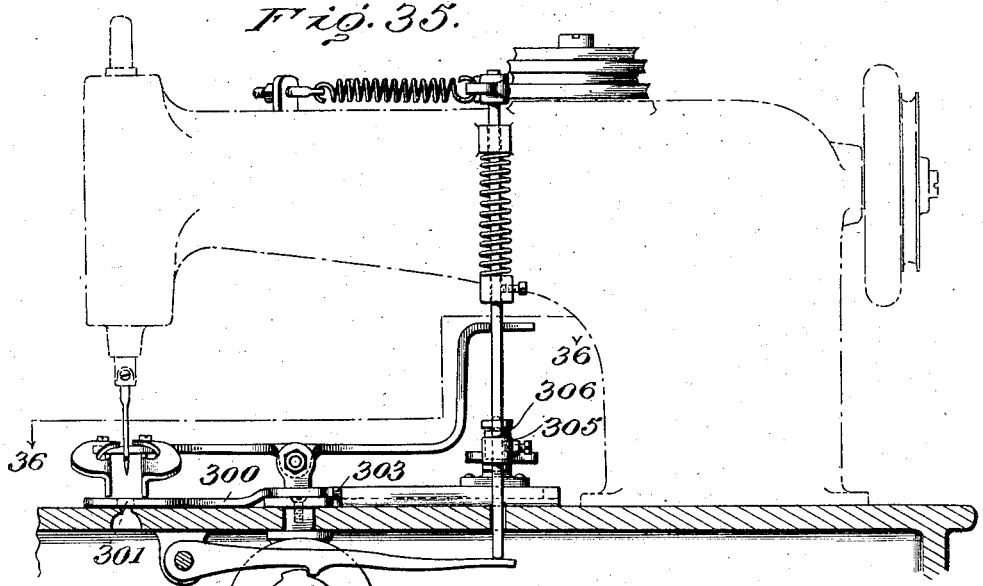
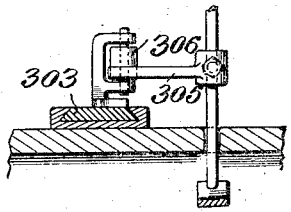
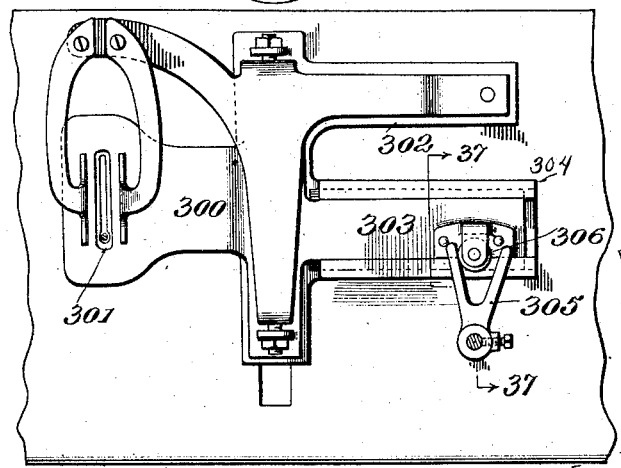
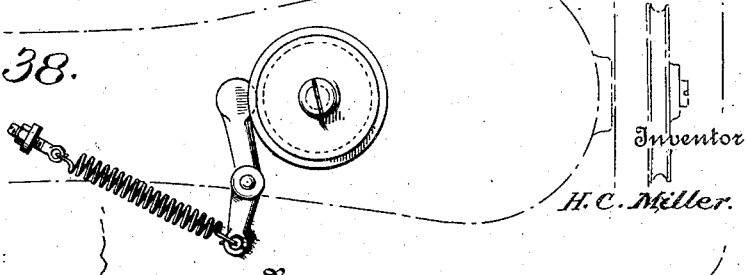

UNITED STATES PATENT OFFICE.

HENRY C. MILLER, OF WATERFORD, NEW YORK.

BUTTONHOLE-SEWING MACHINE.

1,006,583.

Specification of Letters Patent. Patented Oct. 24, 1911.

Application filed March 12, 1906. Serial No. 305,598.

*To all whom it may concern:*

Be it known that I, HENRY C. MILLER, a citizen of the United States, residing at Waterford, in the county of Saratoga and State of New York, have invented new and useful Improvements in Buttonhole-Sewing Machines, of which the following is a specification.

This invention relates to improvements in buttonhole sewing machines.

In all buttonhole machines known to me, the thread is severed by a separate device, after the cutting blade is operated, and in many instances the article is drawn from the machine after the stitching operation is over, and the thread is then severed; the length of the waste thread being greater than is required to stitch a complete buttonhole. With other machines employing automatic cutters the thread is severed some distance from the buttonhole, leaving a length of thread which must be trimmed after the buttonhole is completed. All such machines are expensive, and the operation extremely slow.

According to my present invention I employ essentially mechanism for feeding the material progressively to coöperate with the stitch forming mechanism, in combination with specific means for vibrating the needle to relatively locate one or more stitches in the path of the cutting blade, so that in the formation of the buttonhole slit, the thread is also severed.

The invention also relates to improvements in the mechanism for drawing the thread for the next stitching operation, after the preceding stitches are completed.

The feeding mechanism as herein disclosed serves to perform a very important function in connection with the stitching operation, in that the material being operated upon must be moved in the proper path to receive the desired outline of stitches. In the present machine the material is not properly located after the stitches are formed to permit of the cutting blade descending and severing the thread in its path. Therefore to return the fabric to its initial position for the cutting operation, I have provided manually operated mechanism for returning the feeding mechanism and the material to initial position. This movement of the feeding mechanism places the stitches to be severed in the path of the cutting means to cause the cutting blade to sever the thread and form a slit in the fabric in a plane between the stitches.

My invention also contemplates improvements in the specific mechanism for vibrating the needle, in that I employ a series of revolving cams appropriately connected to operate the needle to first form tying stitches; second the purl or side stitches; third the end-barring stitches; and fourth stitches in the path of the cutting blade, whereby to sever the thread.

The invention also relates to improvements in the specific details of construction, hereinafter referred to.

Figure 2:
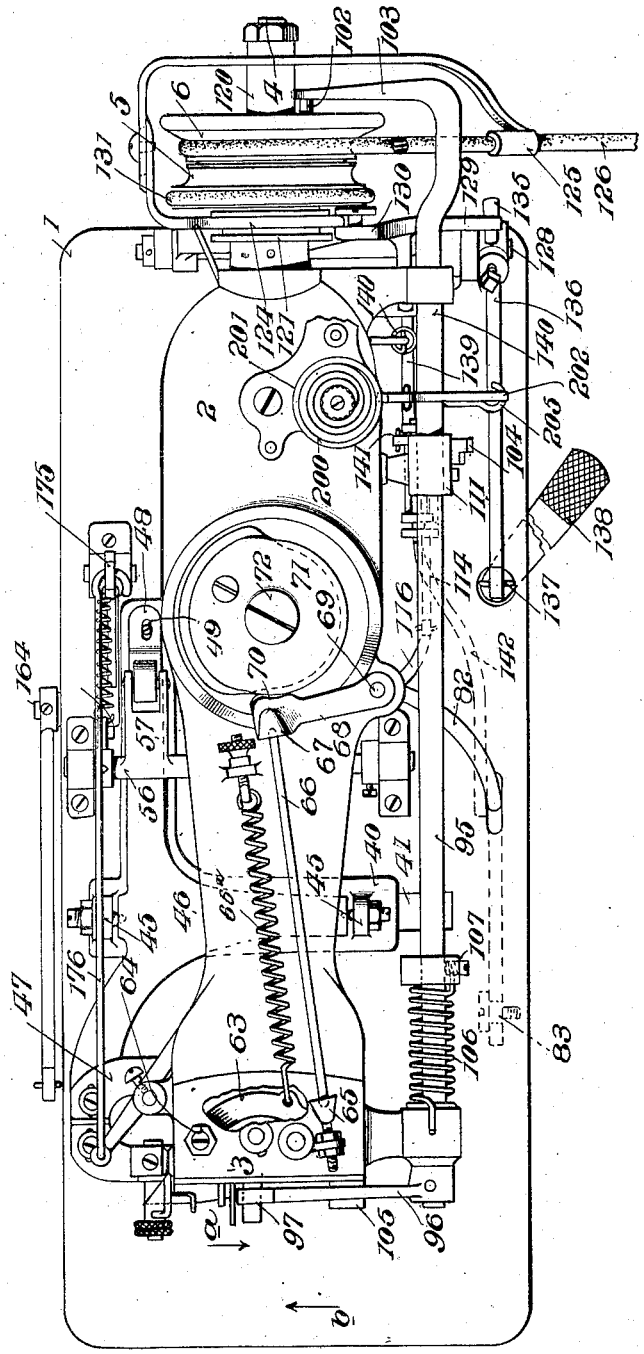
Figure 3:
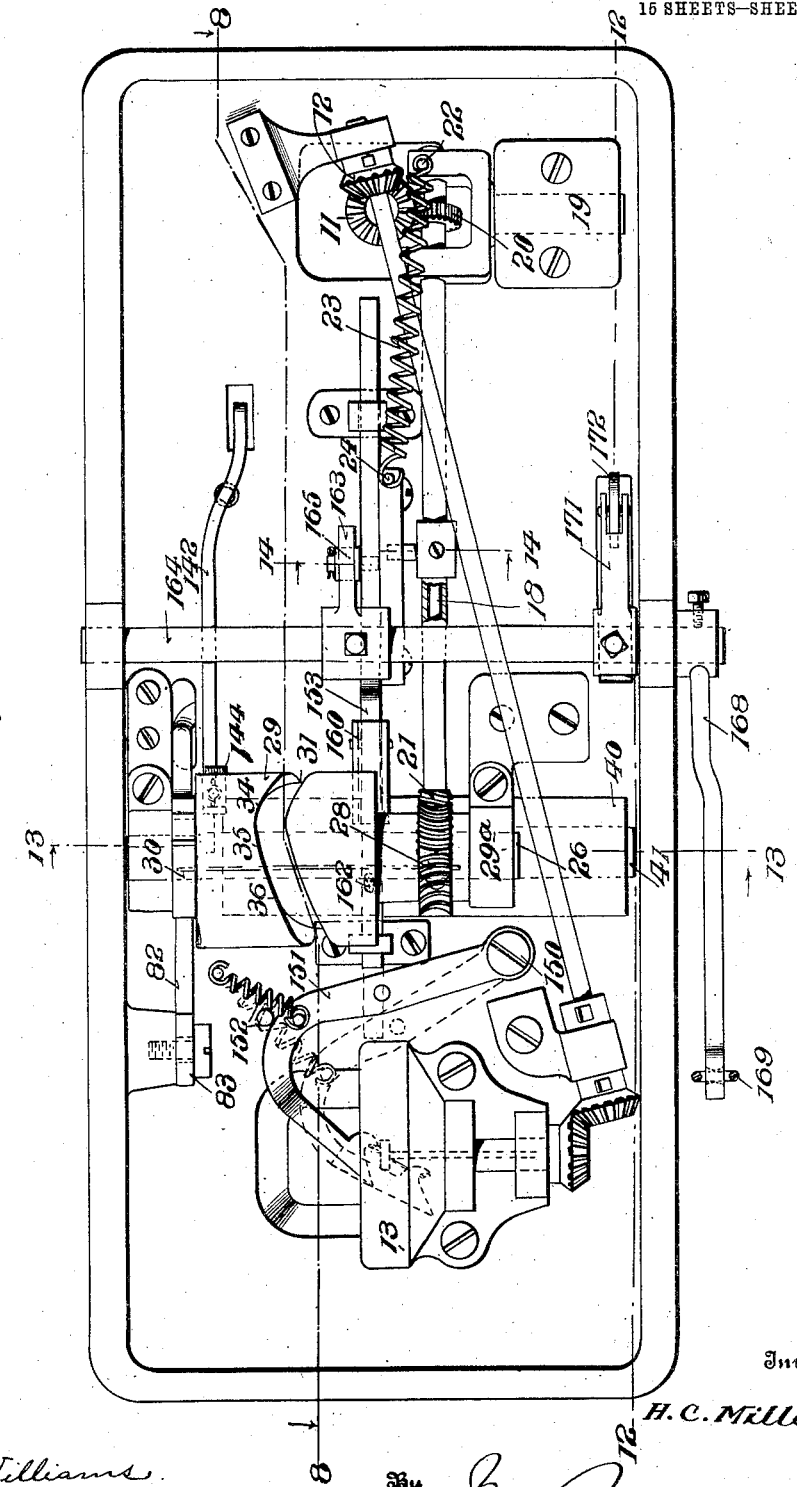
Figure 4:
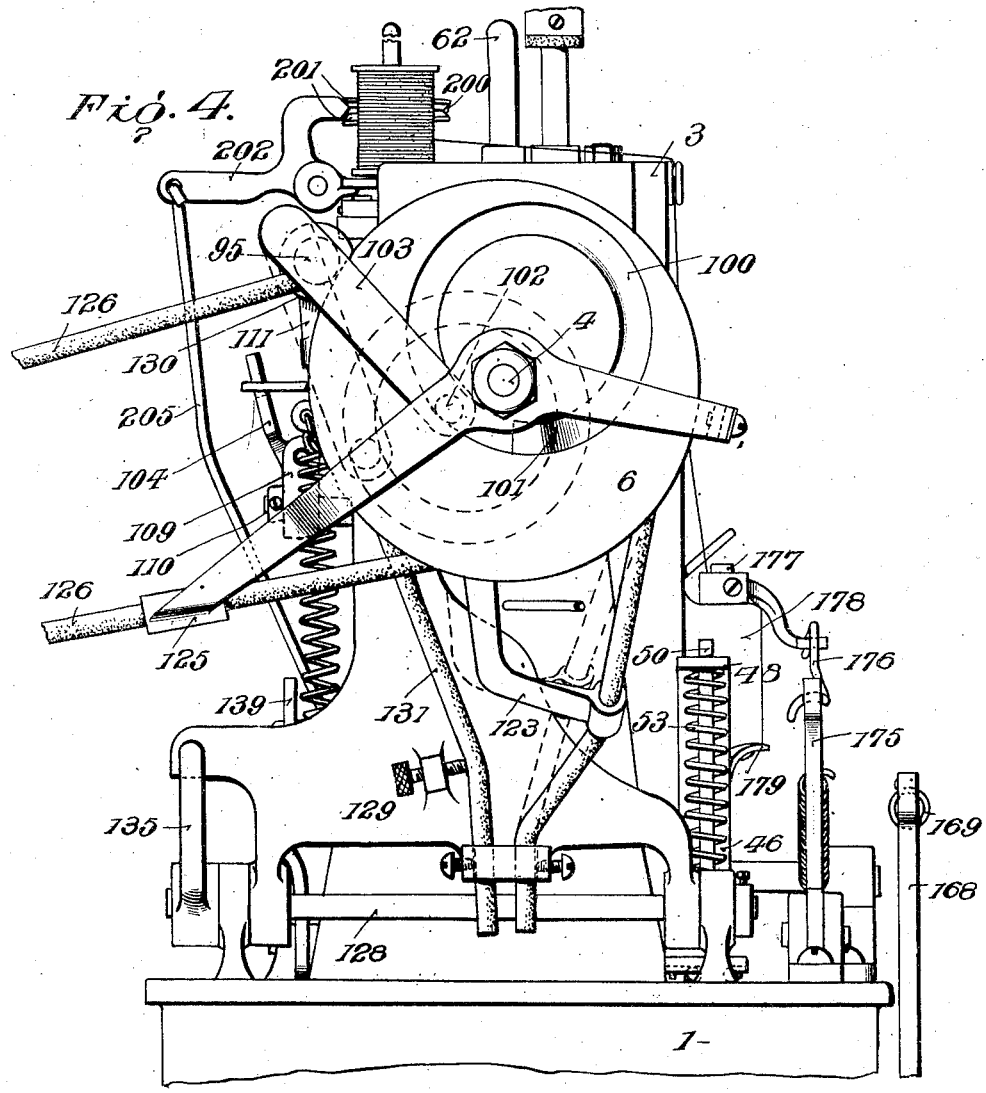
Figure 5:
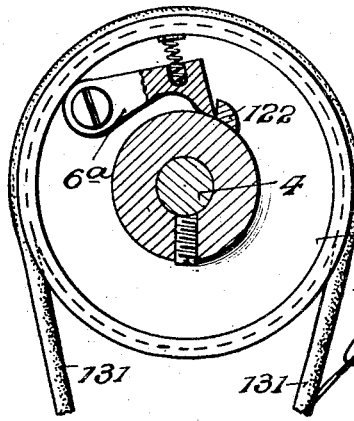
Figure 6:
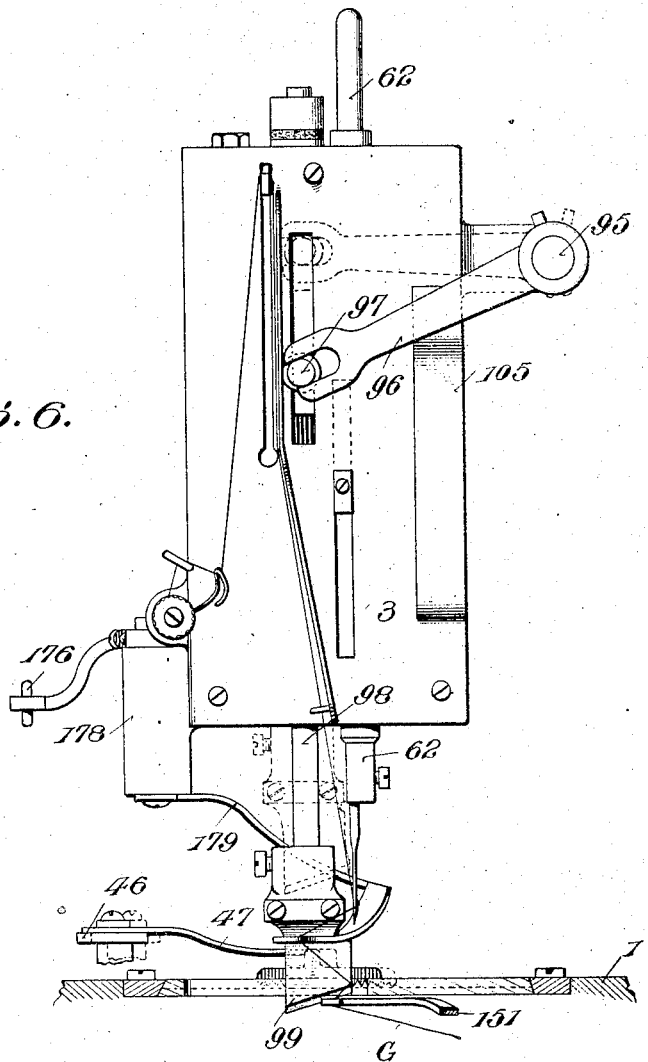
Figure 7:
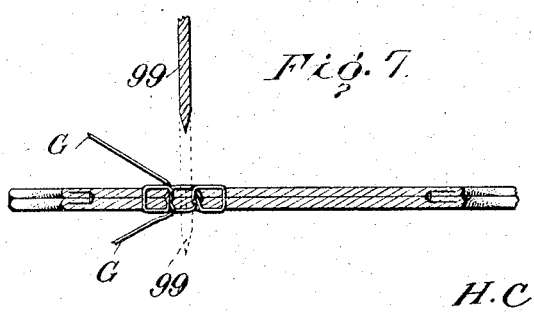
Figure 13:
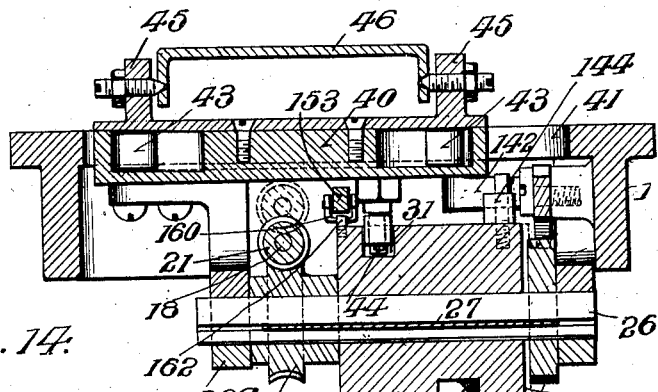
Figure 14:
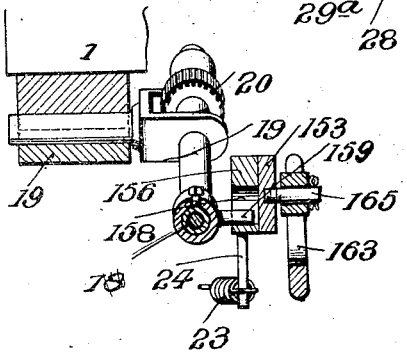
Figure 15:
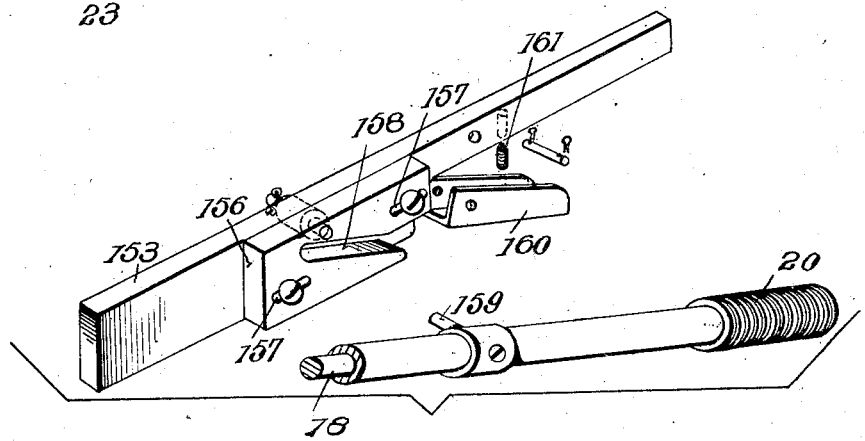

In the drawings: Figure 1 is a side elevation of my improved machine. Fig. 2 is a top plan view. Fig. 3 is a bottom plan view. Fig. 4 is an end elevation. Fig. 5 is a detail face view of the fast pulley. Fig. 6 is an end elevation looking from the head of the machine. Fig. 7 is a detail vertical section, illustrating the position of the upper and lower threads, previous to the descent of the cutting blade, the latter being shown in normal position in full lines, and down in dotted lines. Fig. 8 is a vertical section on the line 8—8 Fig. 3. Fig. 9 is a similar view, taken on the same line, but showing the parts in different position. Fig. 10 is a partial section and side elevation of the right hand end of the machine. Fig. 11 is a detail view of a part of the stop motion. Fig. 12 is a partial vertical section taken approximately on the line 12—12, Fig. 3. Fig. 13 is a transverse section on the line 13—13, Fig. 3. Fig. 14 is a similar view taken on the line 14—14, Fig. 3. Fig. 15 is a detail perspective view of a part of the operating mechanism located under the machine. Fig. 16 is a detail perspective view of the feeding mechanism, parts being separated. Fig. 17 is a detail perspective view of the time cam, and its lever. Fig. 18 is a detail perspective view of a portion of the stop motion and its operating lever. Fig. 19 is a detail face view of a latch for controlling the cutting blade. Fig. 20 is a detail perspective view of said parts separated. Figs. 21 and 22 are detail perspective views of the connection employed between the needle bar and the nest of cams. Fig. 23 is a detail view of the nest of cams. Fig. 24 is a section of the same. Fig. 25 is a detail view of a drum cam for operating the feeding device. Fig. 26 is a diagram of the cam groove in the drum cam.

Fig. 27 is a diagram of a buttonhole formed by my improved machine. Figs. 28, 29 and 30 illustrate views of the feed operating worm. Fig. 31 is a detail view of the needle controlling cam. Fig. 32 is a detail view of a different form of my invention. Fig. 32$^a$ is an end view of the modification. Fig. 32$^b$ is a side view. Fig. 32$^c$ is a detail perspective view of the modified form of cutting blade. Fig. 33 is an elevation view of the right hand end of the machine, illustrating a means for operating the cutting blade before and after the stitching operation. Fig. 34 is a detail section of the same on line 34—34, Fig. 33. Fig. 35 is an elevation of a portion of a sewing machine illustrating a modification of my invention. Fig. 36 is a plan view of the modification shown in Fig. 35. Fig. 37 is a detail section on the line 37—37, Fig. 36. Fig. 38 is a detail plan view of the cams and the lever coöperating therewith, shown in Fig. 35.

The same numerals refer to like parts in all of the figures.

1, indicates a bed-plate of a buttonhole machine on which the various mechanisms are mounted; 2, the arm; and 3, the head. A shaft 4, is mounted in the arm, and it carries fast and loose pulleys 5 and 6, and the bevel gears 7 and 8. The end of the shaft 4, coöperates with the needle bar to impart the necessary reciprocating movement thereto, as will be readily understood.

A vertical shaft 9, is mounted in the upright portion of the arm 2, and has at its upper end a beveled pinion 10, meshing with a beveled pinion 8, and at its lower end said shaft carries a pinion 11, meshing with a pinion 12, to impart motion to the lower stitch forming mechanism 13. On the shaft 9, near the lower end is a worm 14, whose threads are partially spiral as at 15, and partially concentric as at 16. This worm is the means I employ for imparting the necessary intermittent movement to the feeding mechanism, and the co-acting mechanism which vibrates the needle; the worm being constantly revolved during the stitching operation.

A shaft 18 under the bed 1, is mounted in a pivotal bearing 19, and it bears a worm gear 20 which meshes with the worm 14, while at the opposite end the said shaft is provided with a worm 21. A pin 22, depends from the pivoted bearing beyond the worm gear, and to it is secured a spring 23, whose opposite end is fastened to a projection 24 depending from a sliding bar 153. The tension of the spring tends to draw the pin 22 and the end of the shaft down, and elevate the opposite end to disengage the worm 21, from its gear, for a purpose to be described.

Mounted in the bearings depending from bed 1, is a shaft 26, having a worm gear 28, which meshes with the worm 21; and a drum cam 29, between the worm gear 28, and a time cam 30, fixed to the shaft. The cam 29, is formed with a groove 31, which starts at 32, at which point there is a slight dwell, then inclines therefrom to the point 33, where there is a dwell, from where it inclines at 34, to a dwelling point 35, and thence it inclines in an opposite direction, as at 36, to a point 37, where a short reversed portion 38 joins the point 32. Each portion of the cam groove operates the feeding mechanism to move the fabric during the stitching of a buttonhole, the slight dwells referred to coöperating with the groove to accomplish the desired result. When the cam 29, is in its normal position as shown in Fig. 9, and the machine is started, the intermittent movement from the worm 14, is not imparted to the feeder, until the dwell point 32 is past.

A slide 40, reciprocates in a slot 41, in the bed plate, and it consists of an upper and under plate which lap the edges of the slot to form guides; anti-friction rollers and balls 43, bearing against the walls of the slot, serve to reduce the friction. A projection 44 depends from the slide, and it is provided with a roller which fits in the cam groove 31, by which means movement is imparted to the slide as the cam is revolved. In ears 45 on the slide is pivotally mounted a tilting arm 46, carrying at its outer end a pair of yielding combined clamps and feeders 47. Each feeder is adjustably secured to the arm by set screws, and may be independently regulated. The opposite end of the tilting arm is bent upwardly and over, as at 48, and is formed with an opening 49, to receive the end of a pin 50. The lower end of the pin is seated in a cavity formed in an extension 51, of the slide 40, and is threaded to receive a nut 52, between which and the bent end 48, is a coiled spring 53.

A shaft 56, is mounted over the tilting arm 46, and it has fixed to it a projection 57, having a roller, adapted to bear on the arm 46, to rock it on its pivot and elevate the clamp feeders 47, for the release of the fabric, or the insertion of another piece. An arm 58, is fastened to the shaft 56, and is in the path of a lever arm 171, operated by a manually controlled lever 168.

The needle bar 62, reciprocates in a vibrating frame 63, pivoted in the head 3, at 64. The frame is provided with an adjustable screw formed with a cup-shaped depression 65, and in the latter fits one end of a link 66, the other end of which engages a similar depression 67, formed in a cam arm 68, fast on a vertical rod 69; a spring 66$^a$, serving to hold the link in the cups. Cam arm 68, is formed with a head 70, to engage with one of a nest of cams 71, mounted on a stub shaft 72, and formed with a beveled gear 73, meshing with the beveled gear 7.

The nest of cams as shown, consists of four individual cams 71ª, 71ᵇ, 71ᶜ and 71ᵈ, which coöperate with the head 70.

Rod 69, operates in suitable bearings, and is provided with a collar 80, against which and the upper bearing is a coiled spring 81 to normally retain said rod in its lowest position. The lower end of the rod 69, rests on the free end of a lever 82, pivoted at 83, to the bed 1, and it has a projection 84. Projection 84, coöperates with the time cam 30, the latter having peripherical surfaces 87, 87ª, 87ᵇ, 87ᶜ and 87ᵈ, each coöperating with the nest of cams.

On one side of arm 2, is mounted a shaft 95, provided at one end with a bifurcated arm 96, engaging a pin 97, projecting from a bar 98, which carries at its lower end a cutting blade 99. Shaft 95, is adapted to be rocked by a cam groove 100, formed in the face of the loose pulley 6, in which is located an ejecting cam 101, the latter causing the disengagement of a projection 102, on an arm 103, fast on shaft 95. The shaft is not only rocked, but is moved laterally toward and from the head 3, by a latch 104, and when so moved, arm 96, travels on a track or cam surface 105, to insure the projection 102, remaining in the cam groove 100, after the latch 104, has been disengaged.

A coiled spring 106, encircles the shaft 95, being located between one of the bearings and an adjustable collar 107; said spring serving to retain the shaft in its normal position, and also to disengage projection 102, from its groove. The cam 101, is what may be termed a safety device to insure the disengagement of the projection 102, from its coöperating cam groove. The spring will accomplish this function under ordinary circumstances, but with a high speed machine, the rapidly revolving pulley 6, is apt to carry the projection past its disengaging point, hence I have found it expedient to use the cam 101.

The latch 104, is pivotally mounted in a rocking frame 109, mounted on a stud 110, on the arm 2. Said latch coöperates with a projection 111, on shaft 95, to throw the cutter into operation, and offset from the projection, is a lug 112, which is in the path of the latch to disengage the latter from the projection when shaft 95 is rocked to insure of the cutter making but one stroke. A lever 114, attached to the rocking frame, is connected by a link 115, to an arm 116, on the shaft 56, so that upon movement of the shaft after the stitching operation is over, the latch is moved to throw the cutter into operation.

The stopping and starting mechanism is substantially the same as that described in my pending application No. 262,401, filed May 26, 1905, but in order that the operation of the present invention may be understood I will briefly describe it.

The fast pulley 5, is formed with a sleeve 120, on which the loose pulley 6, is mounted, and on the hub of said fast pulley, and a hub of the arm 2, operates a grooved collar 121, provided with a lug 122, and a depending arm 123, having an eye at its outer end. A ring 124, works loosely on the periphery of the collar 121, and an arm extends from the ring, and is connected with a second arm formed with an opening to engage the sleeve 120, and an eye 125, through which the power belt 126 passes. A pivotally mounted spring actuated pawl 6ª is mounted on the inner face of the fast pulley, and is normally in the path of the lug 122. On a shaft 128 mounted on the bed, is a plate 129, which has a flanged end 130, to engage the edge of the ring 124, to move it in the operation of stopping and starting the machine. A yielding belt 131, passes around the grooved periphery of the fast pulley, and the ends of the belt are secured by set screws to a lug on the plate 129. The belt also passes through the eye on the end of the depending arm 123, so that when the latter is rocked by the pawl 6ª contacting with the lug 122, the belt will become tightened. An arm 125 is fast on the shaft 128, and engages a lug on the plate 129, and with the arm is a lever 136, having a chain 137, at its outer end, which is connected with an operating treadle 138. A lever 139, extends from the plate 129, and connected to it is a spring 140, which acts to draw the lever up and throw the parts to stop the machine.

A link 141, connected to the rocking latch 104, has a loop at its lower end through which the lever 139, passes. When the machine is at rest, the link is drawn up by reason of the latch having been thrown outwardly by the lug 112, hence when the lever 139, is depressed to start the machine it encounters the loop and tilts the latch to set it in operative position for the cutting operation.

A latch 142, is pivoted to the bed at 143, and has formed with it a projection to catch over and hold the lever 139, in operative position, while the opposite end of said lever is positioned in the path of a lug 144, on the drum cam 29. At the proper time this lug strikes the lever 142, and disengages the lever 139, to automatically stop the machine.

Pivoted at 150, to the underside of the bed is a curved arm 151, whose free end is formed with a notch to engage the thread of the lower stitch forming mechanism, and a spring 152 is employed to hold the arm in its normal position. A sliding bar 153, is mounted in bearings on the underside of the bed, one end of said rod being positioned opposite a pin on the curved arm 151, as shown in Fig. 3, to engage the same and turn the arm on its pivot to draw the thread slack for the starting of the next stitches. The sliding bar has attached to it a block 156, adjustable by means of screws and slots 157. The block has formed in it an inclined slot 158, to receive a sleeve in which is mounted a pin 159, projecting from a bearing on shaft 18, so that as the bar is moved the pin is caused to follow the slot and rock the shaft 18, in the tilting bearing to disengage the worm 21, from its gear 28. Just after this movement takes place, a finger 160, pivoted to the bar, and normally depressed therefrom by a light spring 161, engages a lug 162, on the drum cam, and slightly turns it, sufficiently to cause the projection 44 to pass the inclined portion 38, of the groove 31, to properly locate the auxiliary stitches under the knife, and position the feeder to start the next buttonhole.

Sliding bar 153, is moved to cause the above mentioned operation by an arm 163, on an operating shaft 164, striking a projection 165, while the spring 23, serves to restore said bar to its normal position. When the bar is advanced, the tension of spring 23, is increased, and as previously described, one end of it is fastened to a projection on the rocking bearing, and assists the pin 159, and cam slot 158, in holding the worm 21, separated from its gear 28.

The shaft 164, has secured to it a lever 168, connected to a chain 169, attached to a pedal 170; also secured to shaft 164, is a lever arm 171, bearing a roller 172, which contacts with a cam arm 173, pivoted at 174, and provided with a lever 175. The lever 175 is connected by a link 176, with the crank arm of a short shaft 177, mounted in bearings 178, on the head 3. Attached to the lower end of shaft 177, is a curved arm 179, the free end of which is positioned to draw the needle thread slack for the next operation.

When the shaft 164, is rocked the lever arm 171 contacts with the arm 173 and rocks it, and through the link connection, the curved arm 179, is moved to accomplish its mission. The device for producing the slack threads being operated by the said shaft, both threads are simultaneously drawn.

When the shaft 164, is rocked, the roller 172, first contacts with the cam arm 173, and then strikes the arm 58, and depresses the tilting arm 46, to raise the feeders 47, however, it will be noted that this operation does not take place until the other movements described have been accomplished.

200, indicates a tension device mounted on the arm 2, and comprising a pair of spring actuated beveled disks 201, between which the thread passes. A bell crank lever 202, is pivoted opposite the disks, the point of said lever being beveled and fits between the disks, while to the free end of said lever is connected a rod 205, secured at its opposite end to the lever 139. When the sewing mechanism is started the bell crank lever 202, is rocked on its pivot, and its beveled end is disengaged from between the disks, so that when the thread is drawn out it is under tension, but when the stitching operation is over, and lever 139, is thrown up to its normal position the disks are spread apart, and the thread is slackened, and the arm 179, draws the thread out to provide ample slack to start the next stitching operation.

The general operation is as follows: The operator depresses treadle 138, and through the arm 135, the plate 129, is rocked on its pivot. The outer end of lever 136, being caught by the catch lever 142, and held until after the stitching operation is over when it is automatically released. When plate 129, is rocked the head 130, moves the ring 124, and this in turn shifts the belt 126, from the loose to the fast pulley. As the ring 124, continues to move, it contacts with the collar 121, and moves the latter, to remove the lug 122, from the path of the pawl 6ª. By the time the lug 122, is out of the way of the pawl, belt 126, is thrown onto the fast pulley, whereupon the power is applied to operate the stitching and feeding mechanisms. The rapidly running fast pulley 5, throws pawl 6ª outwardly against the tension of its spring, where it remains during the stitching operation. Power having been applied, shaft 4, through its connections in head 3, reciprocates the needle, while the gear 7, and its connection operates the vibrating nest of cams 71, and the gears 8, and 10, operate the lower stitch forming mechanism 13, and the feeding devices 47. Shaft 9, is constantly revolved when the fast pulley is in motion, and by the connection between the worm 14, and worm gear 20, shaft 18, is intermittently revolved, hence the drum cam 29. When the machine starts, the projection 44, is at the point 32, and the cam is intermittently revolved, the portions 31, feeding the fabric in direction of arrow a, (Fig. 2,) forming the tying stitches A, and side purl stitches B, (Fig. 27). When the dwell point 33, of cam groove 31, is reached the feeders remain stationary, and the end barring stitches C, are formed, and immediately after their completion, portion 34 of groove 31, reverses the intermittent movement of the feeders 47—47 in direction of arrow b, until dwell point 35, is reached, during which time the opposite side purl stitches D, are formed. At this period the feeders are again held stationary while the opposite end barring stitches E, are formed. These stitches having been completed, the cam groove 31, again reverses the movement of the feeders, in the direction of the arrow $a$, to form the short auxiliary or tying stitches F, after which the stitching mechanism is automatically stopped, by the lug 144, contacting with the lever 142; the projection 44, remaining at the point 37, as shown in dotted lines in Fig. 26. The time cam 30, is intermittently revolved simultaneously with the drum cam, and the peripherical faces 87, 87$^a$, 87$^b$, and 87$^d$, are arranged to act in conjunction with the movement of the feeders. The cam 30, in its initial position is shown in Fig. 17, at which time the projection 84, is approximately between the cam surfaces 87$^d$ and 87$^a$. When the machine is started, cam 87, operating through connections 82 and 68, positions head 70, opposite cam 71$^a$ of nest 71, to produce the tying stitches, and after these stitches are completed and while the needle is in the fabric, the ends of cam 87$^a$, operates through the connections to position head 70, opposite the cam 71$^d$, which forms the side purl stitches B. Cam 87$^a$, is of such proportions as to hold head 70, in contact with the cam 71$^d$, until stitches B, are completed, then cam 87$^b$, operating through the connections switches head 70, opposite cam 71$^c$, to produce end barring stitches C, and cam 87$^c$, operates through the connections to switch head opposite the cam 71$^b$, to form the opposite side purl stitches D, then cam 87$^d$ positions head 70, opposite cam 71$^e$ to form the other end barring stitches E, then the projection 84, drops onto cam 87, to again position head opposite cam 71$^a$, to form the auxiliary stitches F, which are to be cut by the cutting blade. After these stitches are completed the adjustable lug 144, on the drum cam strikes the end of lever 142 and engages the lever 136 of the plate 129, and the spring 130 immediately applies the stop motion mechanism. When the stitching operation ceases, the pin 44, is at the point indicated at 32, leaving the stitching mechanism in an abnormal position. When the plate 129, is returned to normal position by its spring the power belt is first thrown from the fast to the loose pulley, and simultaneously the friction belt 131, is tightened on the fast pulley to reduce the speed of the latter. The movement of the plate also moves the collar 124, toward the fast pulley, and positions the lug 122, in a plane with the pawl 6$^a$. The friction of the belt 131, gradually reduces the speed of the pulley until the spring of the pawl 6$^a$, overcomes the centrifugal force, and advances the point of said pawl toward the center of the shaft, whereupon it encounters the lug 122, and rocks the depending arm 123, and the friction belt is further tightened on the fast pulley, (see Fig. 4) and quickly brings the power shaft to a stand-still. This stopping means while absolutely effective and sure, does not in the slightest cause a sudden jar, and because of the proper timing of the parts the needle is stopped above the fabric. The buttonhole stitches are now completed, and it only remains to cut the slit X, sever the threads F, and set the feed operating mechanism for the next operation. When the operator pulls down the lever 139, it engages the loop of the link 141, and rocks the latch, to position it in a plane with the lug 111, on shaft 95, as previously described, whereby the cutting blade can be manually thrown into connection with the power mechanism.

It will be remembered that when the stitching operation was completed the projection 44, was at the point 37, and it must be manually moved to the point 32, to properly position the stitches relative to the cutting blade, and to locate the feeders to form the stitches for the next button-hole, but before this can be accomplished the worm 21, and its gear 28, must be separated. The operator, therefore, draws down the lever 168, and rocks the shaft 164, causing arm 163, to contact with roller 165, which first rocks the shaft 18, on its pivotal bearing 19, by means of the pin 159, riding in the inclined slot 158, which disconnects the worm 21 and gear 28. In the movement of the bar 153, its end strikes the curved arm 151, and draws the lower thread to provide slack enough for the next stitching operation. Simultaneously with this movement roller 172, rocks lever 175, and through the connection the upper curved arm 179, is turned to draw the upper thread to provide slack enough for the next successive stitching operation. As the movement of the bar 153, is continued and after the worm and gear are disconnected, the finger 160, strikes the lug 162, on the drum cam 29, and turns it sufficiently to position the projection 44, at the starting point of the cam groove 30, which moves the feeders to properly position the stitches relative to the cutting blade. After the threads have been drawn out to produce the necessary slack, the arm 116, on shaft 56, rocks the frame 109, on its pivot, and the latch 104, forces the shaft 95, against the spring 106, and the projection 102, on arm 103, is forced into the cam groove 100, in the face of the loose pulley 6. Immediately the cam groove 100, rocks shaft 95, arm 96, travels on the cam surface 105, insuring the engagement of the projection and cam groove, to complete the stroke of the cutting blade. When the shaft 95, is rocked, the lug 112, kicks the latch 104, out of the way, to insure of the cutting blade making but one stroke, notwithstanding the operator is still holding down the lever 168. When the loose pulley has made one complete revolution, the cutting blade is forced down and drawn up again, whereupon the spring 106, and the projection engaging the cam 101, returns the shaft 95, to its normal position. The parts are so timed that, immediately the cutting blade descends to sever the stitches F, and cut the slit in the fabric by continued pressure on the lever 168, the roller 172, will contact with arm 58, and rock shaft 56, and elevate the clamp-feeders, for the withdrawal of the fabric, and the insertion of another piece. Upon release of pressure on the treadle 170, the springs 23, and 136, return the parts to their normal position. When the threads are placed in the path of the cutting blade during the stitching operation as heretofore described, by a single operation of said cutting blade the thread is severed and the slit is formed in the fabric. I may however employ a separate cutter for severing the threads (see Fig. 32) the same passing through the fabric to sever the lower thread, and the usual cutting blade operating to form the slit in the well known manner. Under these conditions it would be preferable but not necessary to form the slit prior to the formation of the stitches. In Figs. 32$^a$, 32$^b$, and 32$^c$, I have further illustrated this form of my invention. The auxiliary blade 99$^a$, is pivotally mounted at 99$^b$, and is connected by a link 99$^c$ with an extension 99$^d$ of the curved arm 179. When the latter is operated, as previously described, the auxiliary blade is turned on its pivot and its cutting end is thrust through the fabric and severs the threads.

Broadly stated, this invention is designed primarily to produce button hole stitching of appropriate design according to the number and style of cams in the cam nest and in addition produce one or more auxiliary stitches in the path of the cutting blade. I do not desire to be limited to the exact time of locating or particular location of these stitches, as it is evident they may be formed at the beginning of the stitches, instead of the end as shown and described. Furthermore, I may operate the cutting blade previous to the stitching operation to produce the slit and operate the same blade, or an auxiliary blade, to sever the threads.

In placing the auxiliary stitches, it is not essential that they all be severed as the mechanism may be arranged whereby the cutting blade will only sever one or more of said stitches, leaving others to assist in strengthening or tying the fabric adjacent the end of the slit.

My invention is not limited to a button-hole machine of the type shown, as it is evident a vibrating clamp machine may be used. Furthermore the machine may be operated without the employment of the automatic means for severing the thread. This modification is shown in Figs. 35 to 38. The cams 26 and 29, are employed but co-operate with specific mechanism to accomplish the desired result. The clamp carrying the material being operated upon is vibrated, instead of vibrating the needle, as heretofore described. The numeral 300 indicates a cloth clamp or plate, in which is an opening 301, which will permit the needle and cutting blade to pass and perform their respective functions. The clamp support 302 has but one movement in a straight line, and is actuated by cam 29. Mounted on top of support 302 is a slidably mounted piece 303, operating in guides 304. This will permit the zigzag movement of the clamp under the needle for placing the bar and side stitches. On rod 69, is a crotch lever 305, which engages the roller 306, fastened to the piece 303, which will therefore be moved the distance equal to the throw of the respective cam of the cam nest. Obviously with such a construction the needle may operate in the usual vertical path, but the clamp and fabric will be vibrated by the cam nest, and the same previously described result obtained.

In the modification shown in Fig. 33, means are provided for operating the cutting blade before and after the stitching operation. In this figure the latch 104, is similar to the one previously described, but in addition, said latch must be held in the path of movement of the lug 111, and I therefore provide for this purpose a spring 180, which has its end bearing against the bottom of the latch and therefore throws the upper end of said latch normally in the path of end of projection 111. The lower end of link 115, is formed with an elongated slot 181, through the end of which passes the arm 116, and connected to the link is a chain or other connection 182, attached at its opposite end to an equalizing bar 183. The other end of bar 183, has connected to it a chain or the like connection 184, and between the chains, another connection 185, is attached to the bar as shown.

With the construction, the operator depresses the pedal 138, and through the equalizing bar connections 182 and 184, the latch is thrown toward the left to operate the cutting mechanism, and when stop 186 is reached, the continued pressure will pull down lever 136, and start the sewing mechanism, in the meantime the movement of lug 112 has kicked latch 104, out of its path, which permits the cutting mechanism to assume normal position as previously described. Upon release of pedal 138, the latch assumes normal position to be operated through lever 116 and link 115, after the stitching operation is completed.

What I claim is:

1. In combination, stitch forming mechanism, a cutting blade, and means operating the stitch forming mechanism to place a series of main stitches and auxiliary stitch or stitches in the body of the material being operated upon, the auxiliary stitches being located in the path of the cutting blade, and means for operating the cutting blade to sever only the auxiliary stitches in the material.

2. In a buttonhole machine, the combination with stitch forming mechanism for forming two rows of stitches and auxiliary stitch or stitches intermediate the two rows of stitches in the body of the material being operated upon, a cutting blade, and means for operating the cutting blade to sever the auxiliary stitch or stitches in the body of the material.

3. In a buttonhole machine, the combination with stitch forming mechanism, a cutting blade, a work clamp, means creating a relative movement between the stitch forming mechanism and the work clamp to cause the stitch forming mechanism to produce side buttonhole stitches, and auxiliary stitches intermediate the side stitches, and means for operating the cutting blade to sever selected stitch or stitches of the auxiliary stitches, the remaining auxiliary stitches serving as tying stitches.

4. In a buttonhole machine, the combination with stitch forming mechanism, means for operating the stitch forming mechanism to produce tying stitches, side stitches, and auxiliary stitches in the body of the material being operated upon, and means for severing the auxiliary stitches in the body of the material.

5. In a buttonhole machine, the combination with stitch forming mechanism, means for operating the stitch forming mechanism to produce side stitches and auxiliary stitches, a cutting blade, and means for operating the cutting blade to sever selected auxiliary stitches and sever the fabric, the remaining uncut auxiliary stitches forming tying stitches between the side stitches.

6. In a buttonhole machine, the combination with stitch forming mechanism, a nest of cams for operating the stitch forming mechanism to form a series of main stitches, one cam of said nest of cams operating the stitch forming mechanism to produce auxiliary stitches in the body of the material being operated upon, and a cutting blade to sever the auxiliary stitches in the body of the material.

7. In a buttonhole machine, the combination with stitch forming mechanism, a nest of cams for operating the stitch forming mechanism to form a series of main stitches, one cam of said nest of cams operating the stitch forming mechanism to produce auxiliary stitches, and a cutting blade to sever the auxiliary stitches and form a slit in the fabric.

8. In a buttonhole machine, the combination with stitch forming mechanism, a cutting blade feeding mechanism, means for moving the feeding mechanism for the material to receive the usual side stitches, and auxiliary stitches, and means for stopping the feeding mechanism at the termination of the auxiliary stitches, manual means for returning the feeding mechanism to normal position, and causing the operation of the cutting blade to sever the auxiliary stitches in the material.

9. In a buttonhole sewing machine, the combination with stitching mechanism for producing side stitches and auxiliary stitches, means for drawing the stitching thread to make it slack for the next stitching operation, a cutting blade, and means operating the cutting blade to sever the auxiliary stitches in the body of the material.

10. In a buttonhole sewing machine, the combination with stitching mechanism for producing buttonhole stitches and auxiliary stitches, means for drawing the stitching thread to make it slack for the next stitching operation, a cutting blade, and means operating the cutting blade to sever the auxiliary stitches, and form a slit in the fabric between the buttonhole stitches.

11. In a buttonhole sewing machine, the combination with stitching mechanism for producing buttonhole stitches and auxiliary stitches, feeding means, means for stopping the feeding means at a point distant from its starting point, means for drawing the stitching thread to make it slack for the next stitching operation, a cutting blade, and means for returning the feeding means to its starting point, operating the thread slacking means, and starting the operation of the cutting blade.

12. In a buttonhole sewing machine, the combination with stitching mechanism for producing buttonhole stitches and auxiliary stitches, feeding means, means for stopping the feeding means at a point distant from its starting point, means for drawing the stitching thread to make it slack for the next stitching operation, a cutting blade, and manual means for returning the feeding means to its starting point, operating the thread slacking means, and starting the operation of the cutting blade.

13. In a buttonhole machine, the combination with stitch forming mechanism for forming buttonhole stitches and auxiliary stitches, a cutting blade, feeding means, means for operating the feeding means and stopping same at a point distant from the starting point at the termination of the auxiliary stitches, and means for returning the feeding means to normal position and causing the operation of the cutting blade to sever the auxiliary stitches and form a slit in the fabric.

14. In a buttonhole machine, the combination with stitch forming mechanism for forming buttonhole stitches and auxiliary stitches, feeding mechanism, means for operating the feeding mechanism and stopping it at a point distant from the starting point, a cutting blade, means for operating the cutting blade, starting mechanism including a latch which coöperates with means which operates the cutting blade, and manual means for returning the feeding means to normal position and operating the latch to cause the cutting blade to operate.

15. A buttonhole sewing machine comprising stitch forming mechanism for stitching around a buttonhole, a cutting blade, means for actuating the stitch forming mechanism to form stitches in a line with the plane of cut of the buttonhole and in the path of the cutter, and means for operating the cutting blade to sever the stitches in its path, the uncut stitches in the line with the cut serving to tie the buttonhole.

16. A buttonhole sewing machine comprising stitch forming mechanism for stitching around a buttonhole, a cutting blade, means for actuating the stitch forming mechanism to form end tying stitches prior to the starting of the stitches around the buttonhole, means for actuating the stitching mechanism to form stitches in a line with the plane of the cut of the buttonhole and in the path of the cutting table, and means for operating the cutting blade to sever the stitches in its path, the uncut stitches in line with the cut serving to tie the buttonhole.

17. A buttonhole sewing machine, comprising a work support, stitch forming mechanism, a cutting blade, means for creating relative movement between the work support and the stitch forming mechanism, including a nest of cam surfaces, and coöperating mechanism to bring a predetermined cam surface into coöperation with the means which create the relative movement between said work support and stitch forming mechanism, one of said cam surfaces situated to cause one or more stitches to be produced in the path of the cutting blade, and means for operating the cutting blade to sever the stitch in its path and the material.

18. A buttonhole sewing machine comprising stitch forming mechanism for forming end barring and side purl stitches, a cutting blade, means for actuating the stitch forming mechanism to form end tying stitches in line with the plane of the cut of the cutting blade, means for actuating the stitch forming mechanism after the stitches around the buttonhole are formed to form end tying stitches in line with the plane of the cut of the cutting blade, and means for operating the cutting blade to sever selected stitches in the body of the material.

19. A buttonhole machine, including a work support, stitch forming mechanism, a cutting blade, means for creating a relative intermittent movement between the stitch forming mechanism and the support, to produce stitches conforming to a buttonhole and additional stitches in the path of the cutting blade, and means for operating the stitch forming mechanism and the cutting blade.

20. A buttonhole machine, including stitch forming mechanism having a part vibrated by revolving cams, revolving cams, one of said cams operating to cause the vibrating part of the stitch forming mechanism to locate a stitch or stitches in the body of the material being operated upon in the path of movement of a cutting blade, a cutting blade, and means for operatng the cutting blade to sever the stitches in the body of the material.

21. In combination, stitch forming mechanism, a cutting blade for forming buttonholes, mechanism for operating the stitch forming mechanism to produce one or more stitches across the path of the cutting blade, and means for operating the cutting blade to sever the stitches in the body of the material.

22. A buttonhole sewing machine comprising stitch forming mechanism, including a reciprocating and vibrating needle bar and needle, a nest of cam surfaces, means between the cam surfaces and the needle for transmitting vibratory motion to the latter, one of said cam surfaces vibrating the needle to produce one or more stitches in the path of a cutting blade, a cutting blade, means for shifting the means between the cam surfaces and the needle from one of said cam surfaces to another, and means for operating the cutting blade to sever the stitches in its path and the fabric.

23. A buttonhole sewing machine comprising a work support stitch forming mechanism, means for producing relative movement between the work support and the stitch forming mechanism to produce two rows of stitches and one or more stitches across the path of a cutting blade, a cutting blade, and means for operating the cutting blade to sever the stitch in its path and the fabric between the two rows of stitches.

24. A buttonhole sewing machine comprising stitch forming mechanism, including a reciprocating and vibrating needle bar and needle, mechanism for operating the needle bar, including a nest of cam surfaces, a bar between the cam surfaces and the needle bar, means for shifting the bar from one surface to the other, a cutting blade, and means for operating the cutting blade for severing one of the stitches produced by the reciprocating and vibrating needle, and the fabric.

25. In combination, stitch forming mechanism and cutting mechanism having a cutting blade for forming buttonholes, means for intermittently feeding the material being operated upon between the formation of the stitches, means for vibrating a part of the stitching mechanism to produce stitches conforming to a buttonhole and additional stitches in the path of the cutting blade, and means for operating the stitch forming mechanism and cutting blade to sever the stitches in the body of the material in the path of movement of the cutting blade.

26. In combination, mechanism for forming tying stitches at the beginning and ending of the formation of a buttonhole and mechanism for forming the usual buttonhole stitches, a cutting blade, feeding mechanism including a feeder having a projection and coöperating cam groove formed with a dwell, said cam groove and projection causing the feeder to move back and forth in a determinate path, the said dwell causing the feeder to remain stationary for the placing of the tying stitches.

27. In a buttonhole machine, the combination with stitch forming mechanism, a work clamp, means for producing relative movement between the work clamp and the stitch forming mechanism for forming usual buttonhole stitches and auxiliary stitches, a cutting blade, and means for operating the cutting blade to sever one or more of the auxiliary stitches in the body of material.

28. In combination, stitching mechanism for forming rows of stitches, a cutting blade, means operating the cutting blade previous to the operation of the stitching mechanism, and means for operating the cutting blade after the operation of the stitching mechanism, to sever the threads of the stitching mechanism and form a slit between the rows of stitches.

29. In a buttonhole machine, the combination with stitch forming mechanism to form a series of stitches, a cutting blade, means for operating the cutting blade before the stitching operation, means for operating the cutting blade after the stitching operation to sever certain of the stitches, the cutting blade in operation passing through the fabric.

30. In a sewing machine, the combination with stitch forming mechanism, a work clamp, means for producing relative movement between the stitch forming mechanism and work clamp for forming stitches in a fabric, means for severing the stitches at a predetermined locality and to simultaneously pass through a limited area only of the fabric.

31. In a sewing machine, the combination, with stitch forming mechanism including means adapted to form buttonhole stitches, and also tying stitches and means for severing one or more of the tying stitches, said severing means in operation passing through a limited area only of the material being operated upon.

32. In a sewing machine, the combination, with stitch forming mechanism including means adapted to form buttonhole stitches and one or more extra stitches, the extra stitches being located in the path of a cutting blade, and a cutting blade for cutting said extra mentioned stitches, said cutting blade in operation passing into a limited area only of the material being operated upon and alongside the buttonhole stitches.

33. In a buttonhole sewing machine, the combination with stitch forming mechanism, a work clamp, means for producing relative movement between the stitch forming mechanism and work clamp for forming buttonhole stitches in a fabric, means for severing part of the stitches at a predetermined locality and simultaneously passing between the remaining stitches and through the fabric to form a buttonhole.

In testimony whereof I affix my signature, in presence of two subscribing witnesses.

HENRY C. MILLER.

Witnesses:
S. C. BULL,
F. F. FOLLET.